May 15, 1956 R. R. CROOKSTON 2,745,429
SNAP ACTION REGULATOR VALVE
Filed June 26, 1952 2 Sheets-Sheet 1

INVENTOR.
Robert R. Crookston,
BY
AGENT.

May 15, 1956 R. R. CROOKSTON 2,745,429
SNAP ACTION REGULATOR VALVE
Filed June 26, 1952 2 Sheets-Sheet 2

INVENTOR.
Robert R. Crookston,
BY

United States Patent Office 2,745,429
Patented May 15, 1956

2,745,429

SNAP ACTION REGULATOR VALVE

Robert R. Crookston, Houston, Tex., assignor, by mesne assignments, to Esso Research and Engineering Company, Elizabeth, N. J., a corporation of Delaware Application June 26, 1952, Serial No. 295,613

5 Claims. (Cl. 137—492.5)

The present invention is directed to a snap action regulator valve. More particularly, the invention is directed to an air regulator valve which has the advantage of stroking all the way and opening and closing with a snap action. In its more specific aspects, the invention has to do with a valve adapted for use in air systems on drilling rigs which will not become clogged with dirt and locked in a minimum open position.

The present invention may be described briefly as involving a regulator valve which includes a housing having an inlet passageway and an outlet passageway. The housing is provided with a piston cylinder which is in fluid communication at an intermediate point with the inlet and outlet passageway. Arranged in the piston cylinder are interconnected first and second pistons, the first piston having a working area smaller than the working area of the second piston and the first piston being adapted to open and close fluid communication to the cylinder from the inlet and from the cylinder to the outlet. The housing is provided with a valve means which communicates with the inlet passageway by a third passageway defined by the housing and with the piston cylinder ahead of the second piston by a fourth passageway defined by the housing. The valve means is normally urged in a closed position by a biasing means such as a coil spring arranged below the valve. The housing has a diaphragm arranged therein which is provided with means, such as a valve stem, to open the valve. The valve stem is normally urged downwardly against the valve to hold the valve in an open position. The urging means is a spring arranged above the diaphragm which by means of an annular plate bearing against an upper side of the diaphragm biases the valve stem downwardly against the valve. The housing is provided with a fifth passageway which communicates the outlet with a lower face of the diaphragm to provide pressure against the diaphragm to close the valve by lifting the valve stem. The housing has a sixth passageway that communicates the working area of the first piston with the inlet passageway.

Figure 1:
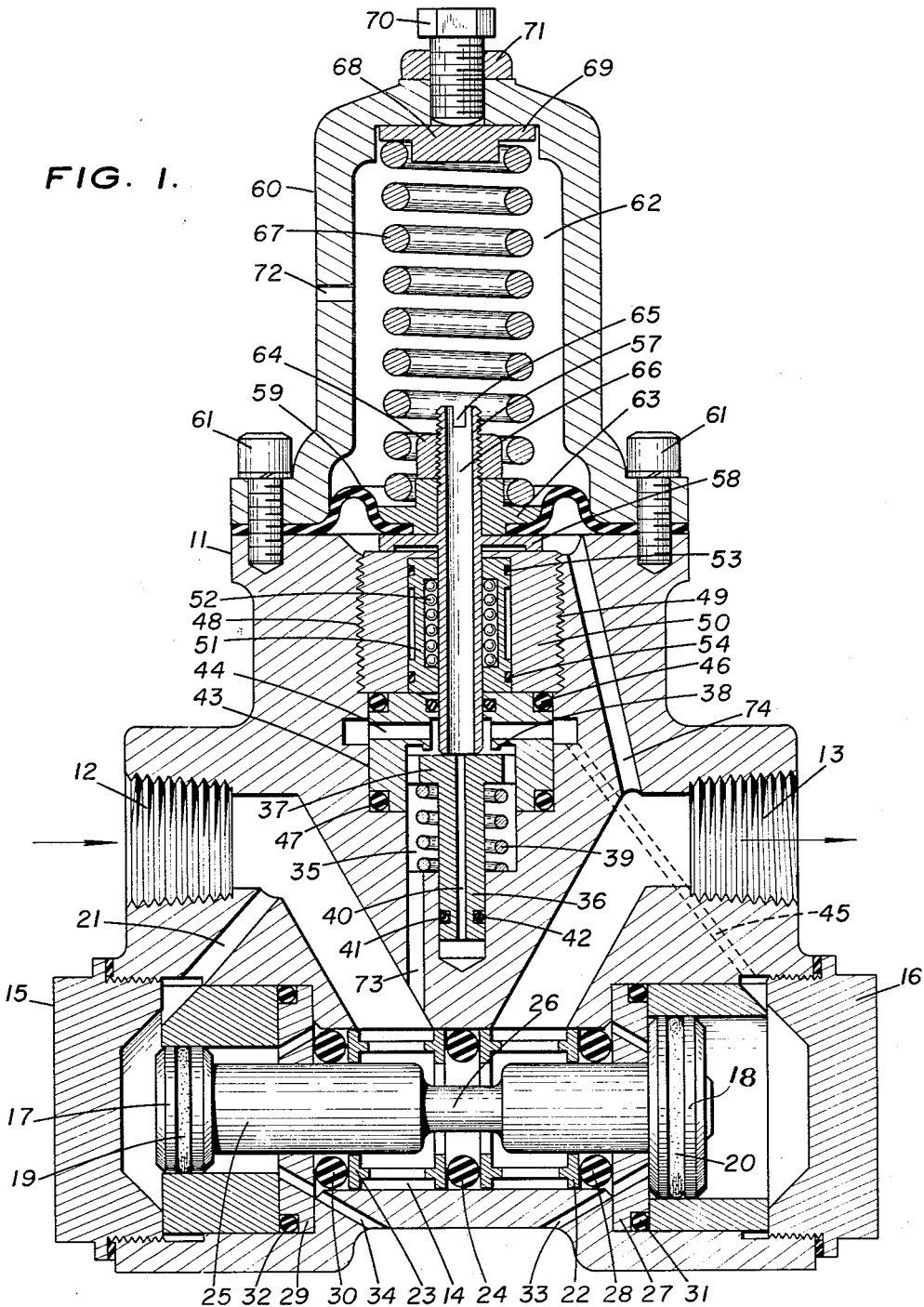
Figure 2:
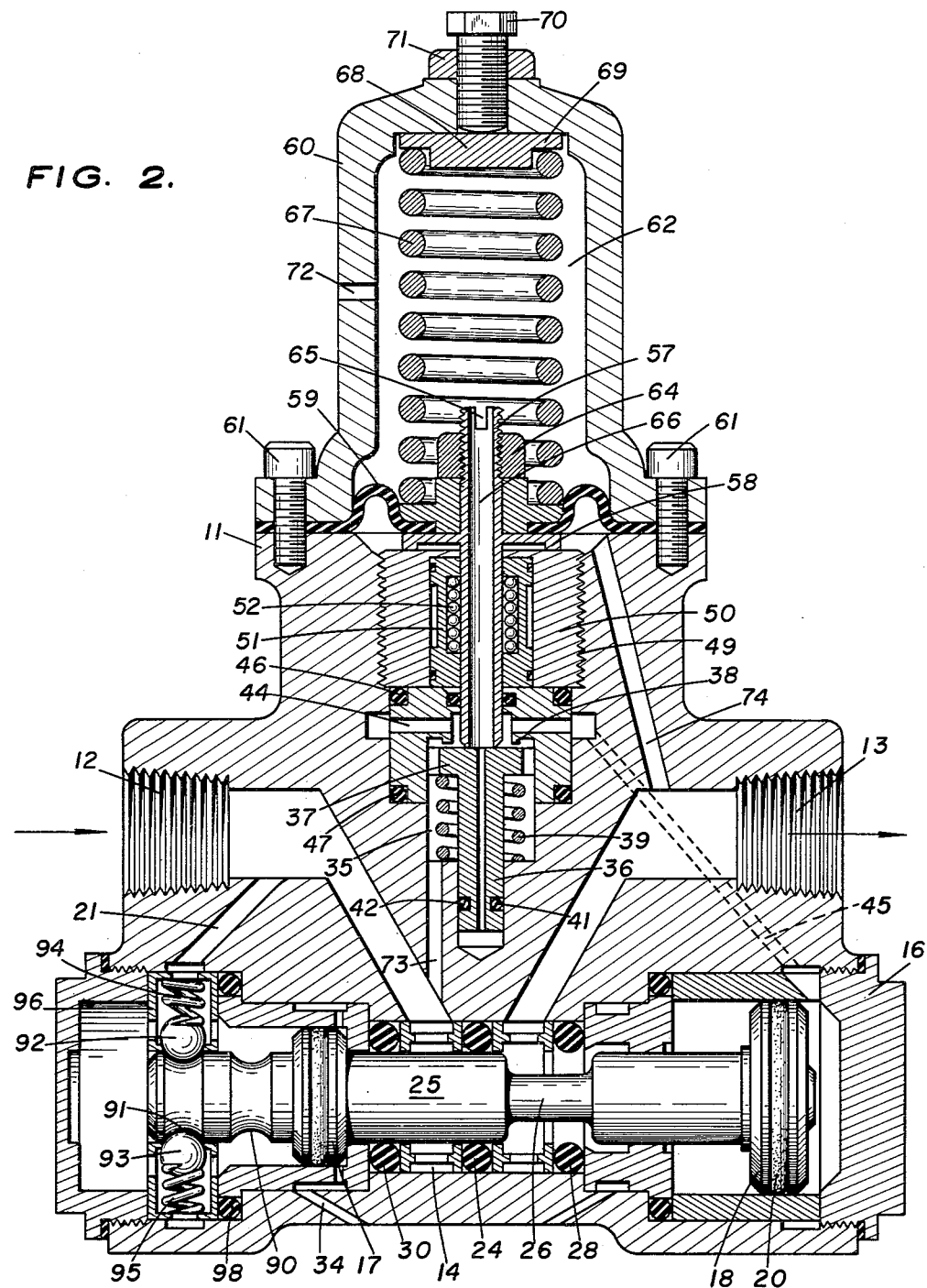

The invention will be described in further detail in conjunction with the drawing in which Fig. 1 is an elevation in section showing one embodiment of my invention; and Fig. 2 is an elevation in section showing a modification of the embodiment of Fig. 1.

Referring now to the drawing in which identical numerals will be employed to designate identical elements, numeral 11 designates a valve housing which is provided with an inlet passageway 12 and an outlet passageway 13. Passageways 12 and 13 may be threaded and connected suitably into an air system, such as may be employed on oil and gas drilling rigs. The inlet passageway 12 may turn downwardly in the housing 11 to communicate with a piston cylinder 14 arranged in the lower portion of the housing 11 and the passageway 13 also turns downwardly to communicate with the piston cylinder 14. The piston cylinder 14 is provided with end members 15 and 16 for ready access thereto and arranged in the piston cylinder 14 are interconnected first piston 17 and second piston 18. The piston 17 is provided with an O-ring 19 to cause a seal with the walls of the piston cylinder while the piston 18 is provided with an O-ring 20 which serves a similar purpose. A passageway 21 communicates the piston cylinder 14 ahead of the working area of the piston 17 with the inlet passageway 12. Arranged within the piston cylinder 14 between the pistons 17 and 18 are spacing members 22 and 23. Between the spacing members 22 and 23 is an O-ring 24 which serves as a seal for the interconnected inlet 12 and outlet 13 which communicate through piston cylinder 14. Interconnected pistons 17 and 18 are connected by a piston rod 25 which is provided with a reduced portion 26 to allow passage of air through the piston cylinder as will be described.

Arranged between the spacing member 22 and a retaining member 27 is an O-ring 28 which causes a seal between the piston rod 25 and the piston cylinder 14. Arranged between the spacing member 23 and a retaining member 29 is an O-ring 30 to effect a seal between the piston arm 25 and the piston cylinder 14. The retaining members 27 and 29 are likewise provided, respectively, with O-rings 31 and 32 to form a seal. The pistons 17 and 18 also are provided with O-rings as has been described.

The piston cylinder 14 is provided with vent ports 33 and 34 to vent any fluid which may have become trapped behind the pistons 17 and 18.

The housing 11 is provided with a cavity 35 in which is arranged a valve generally designated as 36. Valve 36 includes a T-shaped valve member 37 which is designed to seat against a shoulder or seat 38 and a coil spring 39 which is arranged to surround the T-shaped member 37 and to urge the T-shaped member 37 in an upward position. The coil spring 39 has one end bearing against the cavity 35 and the other end bearing against the T-shaped member 37. The T-shaped member is provided with a passageway 40 which serves to equalize pressure from above and below the T-shaped member. The T-shaped member 37 is also provided with a recess 41 in which is arranged an O-ring 42 to allow a seal and to keep the T-shaped member within the cavity 35. The cavity 35 has an enlarged portion 43 in which is arranged seating member 38. The seating member 38 has a passageway 44 which communicates the valve as will be described with a passageway 45 which leads to piston cylinder 14 ahead of the working area of piston 18. The seating member 38 is provided with O-rings 46 and 47 to seal the seating member within the enlarged portion 43 of the cavity 35. The cavity 35 enlarges further from the portion 43 to a portion 48, in which is arranged by a threaded connection 49, a sleeve member 50 in which in turn is arranged a ball bushing 51 provided with longitudinal sliding ball bearings 52. The bushing 51 is provided with seals 53 and 54. Passing through the ball bushing 51 is a valve stem 57 which bears with its lower end against the upper end of the valve member 37. The valve stem 57 is provided with an annular shoulder 58 which rests on the sleeve member 50 and on which, in turn, rests a diaphragm 59 which is secured to the housing 11 and enclosed by a cap 60 by threaded bolts 61. The cap 60 encloses a space 62 into which the valve stem 57 protrudes. The valve stem 57 is surrounded by a plate 63 which is held in position against the diaphragm 59 by a threaded nut 64. The valve stem 57 is provided with a slot 65 for assembly thereof and the valve stem 57 defines a longitudinal passageway 66 which communicates the space 62 with the valve 36.

Bearing against the plate 63 is a coil spring 67 which also bears against the upper interior of cap 60. A retaining plate 68 provided with a shoulder 69 confines the upper end of the spring 67. An adjusting bolt 70 provided with a nut 71 allows tension to be exerted against the plate 68 which allows adjustment of tension on the spring 67. The space 62 in cap 60 is vented to the atmosphere by a vent or passageway 72.

The housing 11 is provided with a passageway 73 which communicates the inlet passageway 12 with the cavity 35 and the valve 36, the purpose of which will be described in more detail hereinafter.

The apparatus of Fig. 2 is identical to the apparatus of Fig. 1 with the exception that the piston 17 is displaced to the right on piston arm 25 to provide on the left-hand end of piston arm 25 grooves 90 and 91 to accommodate locking spheres 92 and 93 which are biased, respectively, against the piston arm 25 by biasing or spring members 94 and 95 arranged in recessed cage 96 which is provided with O-ring 98. The spheres 92 and 93 are designed to seat into the groove 91 when the piston arm 25 is moved to the extreme right and seat into groove 90 when the piston arm 25 is moved to the extreme left.

The apparatus of the present invention operates in the following manner:

It is desired to employ the embodiments of the present invention in an air system in which it is desired that pistons 17 and 18 and the valve 36 will stroke all the way either in the open or shut position such that the pistons and the valve are self-cleaning and do not become locked in a minimum opening position or fail to open at all or stick in an open position when large quantities of air are required, such as when an air pressure reservoir is to be blown down.

Referring specifically to the operation of the device of Fig. 1, it may be assumed that air is being delivered to the inlet passageway 12. The pistons 17 and 18 have been moved to the left and consequently air is being delivered through the inlet 12, through the piston cylinder 14 and thence through outlet 13 and air pressure is exerting a force on the diaphragm 59 through passageway 74. As long as the pressure delivered against the diaphragm 59 through passageway 74 is insufficient to overcome the resistance of the spring 67, the valve 36 with its T-shaped member 37 is held in an open position and air is also delivered through the passageway 12 and passageway 73 to the valve 36, the T-shaped member being held off the seat 38; thence air is delivered through passageway 45 to the piston cylinder 14 ahead of the piston 18 which, as a result, is held to the left and the air freely passes through the passageways 12 and 13.

When the air pressure being delivered through passageway 12 to passageway 13 reaches an amount determined by the area of the diaphragm 59 and the force of the spring 67, the force of air against the diaphragm 59 causes the spring 67 to be lifted which lifts the valve stem 57 and allows the valve 36 to close, the T-shaped member 37 closing against the seating member 38. As a result, air pressure is delivered against the piston 17 through passageway 21 and causes the piston 17 to overcome the piston 18 and to close the passageway from inlet 12 to inlet 13 with the piston arm 25. The air in the piston cylinder 14 ahead of the piston 18 is vented through passageway 45 to the passageway 66 in valve stem 57 and thence into the space 62 and to the atmosphere through vent 72; thus, the only amount of air wasted in the embodiment of the present invention is the amount of air trapped ahead of the piston 18 in the cylinder 14.

Because of the finite area of the seats between the T-shaped member 37 and the seating member 38, the valve has a hysteresis of approximately 3 pounds per square inch gauge. In short, the valve will control to a nominal plus or minus 1.5 pounds per square inch gauge.

The valve of the present invention is a snap action air regulating valve or a pressure reducing valve which has the advantage of absolute dependability under all circumstances. In other words, the valve of the present invention will not hang up in a nearly closed position since it is forced to open all the way every time it opens at all.

The embodiment of Fig. 2 operates similarly to the embodiment of Fig. 1 with the exception in this particular instance the pressure exerted against the piston 17 being sufficient to overcome the locking effect of the locking spheres 92 and 93 in the grooves 91 and 90 which also tends to favor the snap action effect which is obtained in the embodiment of Fig. 1. Thus when the spheres 92 and 93 move out of either groove 90 or 91 the result is to cause the piston arm 25 to move absolutely to the extreme right or the extreme left, depending on which of the two pistons is being overcome which, in turn, depends on the pressure in passageway 74 overcoming the area of diaphragm 59 and the force of spring 67.

The nature and objects of the present invention having been completely described and illustrated, what I wish to claim as new and useful and to secure by Letters Patent is:

1. A valve for regulating a snap-acting main valve and adapted to be operable by outlet pressure from said main valve which consists of, a housing provided with a valve cavity, said housing defining an inlet and an outlet for said valve cavity, with the valve cavity inlet in fluid communication with the inlet of said main valve and the valve cavity outlet adapted to deliver fluid pressure through a first passageway in said housing to operate said main valve, a valve seating member arranged in said cavity, a valve member in said cavity adapted to seat against said seating member and provided with a passageway for equalizing pressure from above and below the valve member, a biasing means embracing said valve member and normally urging said valve member into seating engagement with the seating member, a valve stem in said cavity provided with a passageway communicating fluidly with the passageway in the valve member and the atmosphere normally bearing against the valve member to open said valve member by overcoming said biasing means, pressure responsive means operatively connected to said valve stem and adapted to move said valve stem from said valve member, said outlet pressure being exerted against said pressure responsive means through a second passageway in said housing leading from the main valve outlet, and biasing means operatively connected to said valve stem normally urging said valve stem against the valve member to move the valve member off said seating member.

2. A valve in accordance with claim 1 in which the pressure responsive means is a diaphragm adapted to move said valve stem from said valve seating member by said outlet pressure being exerted against the working face of said diaphragm.

3. A valve for regulating a snap-acting main valve and adapted to be operable by outlet pressure from said main valve which consists of, a housing provided with a valve cavity, said housing defining an inlet and an outlet for said valve cavity, with the valve cavity inlet in fluid communication with the inlet of said main valve and the valve cavity outlet adapted to deliver fluid pressure through a first passageway in said housing to operate said main valve, a valve seating member arranged in said cavity, a balanced valve member in said cavity having a T-shape adapted to seat against said seating member and provided with a longitudinal passageway for equalizing pressure from above and below the valve member, a biasing means embracing the lower end of said T-shaped valve member and normally urging the upper end of said T-shaped valve member into seating engagement with the seating member, an elongated valve stem in said cavity provided with a longitudinal passageway communicating fluidly with the passageway in the T-shaped valve member and the atmosphere normally bearing with its lower end against the upper end of the T-shaped valve member to open said T-shaped valve member by overcoming said biasing means, a diaphragm operatively connected to said valve stem and adapted to move said valve stem from said T-shaped valve member, said outlet pressure being exerted against the working face of said diaphragm through a second passageway in said housing leading from the main valve outlet, and biasing means operatively connected to said valve stem normally urging said valve stem against the upper end of the T-shaped valve member to move the T-shaped valve member off said seating member.

4. A valve for regulating a snap-acting main valve and adapted to be operable by outlet pressure from said main valve which consists of, a housing provided with a valve cavity, said housing defining an inlet and an outlet for said valve cavity, with said valve cavity inlet in fluid communication with the main valve inlet and said valve cavity outlet adapted for delivering fluid pressure through a first passageway in said housing to operate said main valve, a valve seating member arranged in said cavity, a balanced valve member in said cavity having a T-shape adapted to seat against said seating member and provided with a longitudinal passageway for equalizing pressure from above and below the T-shaped valve member, sealing means carried by said T-shaped valve member for sealing same in said cavity, a biasing means embracing the lower end of said T-shaped valve member and normally urging said upper end of the T-shaped valve member into seating engagement with the seating member, an elongated valve stem in said cavity provided with a longitudinal passageway communicating fluidly with the passageway in the T-shaped valve member and the atmosphere normally bearing with its lower end against the upper end of the T-shaped valve member to open said T-shaped valve member by overcoming said biasing means, a diaphragm operatively connected to said valve stem and adapted to move said valve stem from said T-shaped valve member, said outlet pressure being exerted against the working face of said diaphragm through a second passageway in said housing leading from the main valve outlet, said valve stem extending through said diaphragm, and biasing means operatively connected to said valve stem normally urging said valve stem against the upper end of the T-shaped valve member to move the T-shaped valve member off said seating member.

5. A valve for regulating a snap-acting main valve and adapted to be operable by outlet pressure from said main valve which consists of, a housing provided with a valve cavity, said housing defining an inlet and an outlet for said valve cavity with said valve cavity inlet in fluid communication with the main valve inlet and said valve cavity outlet adapted for delivering fluid pressure through a first passageway in said housing to operate said main valve, a valve seating member arranged in said cavity, a balanced valve member in said cavity having a T-shape adapted to seat against said seating member and provided with a longitudinal passageway for equalizing pressure from above and below the T-shaped valve member, sealing means carried by said T-shaped valve member for sealing same in said cavity, a biasing means embracing the lower end of said T-shaped valve member and normally urging the upper end of said T-shaped valve member into seating engagement with the seating member, an elongated valve stem in said cavity provided with a longitudinal passageway communicating fluidly with the passageway in the T-shaped valve member and the atmosphere normally bearing with its lower end against the upper end of the T-shaped valve member to open said valve member by overcoming said biasing means, a ball bushing in said cavity surrounding said valve stem, ball bearings in said bushing, a diaphragm operatively connected to said valve stem and adapted to move said valve stem from said T-shaped valve member, said outlet pressure being exerted against the working face of said diaphragm through a second passageway in said housing leading from the main valve outlet, and biasing means operatively connected to said valve stem normally urging said valve stem against the upper end of the T-shaped valve member to move the T-shaped valve member off said seating member.

References Cited in the file of this patent

UNITED STATES PATENTS

| | | |
|---|---|---|
| 510,635 | Duval | Dec. 12, 1893 |
| 860,384 | Jeffries | July 16, 1907 |
| 953,403 | Turner | Mar. 29, 1910 |
| 1,000,729 | Gloeckler | Aug. 15, 1911 |
| 1,304,162 | De Schamps | May 20, 1919 |
| 1,903,338 | Horne | Apr. 4, 1933 |
| 2,518,852 | Annin | Aug. 15, 1950 |

FOREIGN PATENTS

| | | |
|---|---|---|
| 403,787 | Great Britain | 1934 |